United States Patent
Clermont et al.

(10) Patent No.: US 12,366,953 B2
(45) Date of Patent: Jul. 22, 2025

(54) USER INTERFACE FOR VIEWING OPTIC WITH WIND DIRECTION CAPTURE

(71) Applicant: Sheltered Wings, Inc., Barneveld, WI (US)

(72) Inventors: Todd Clermont, Barneveld, WI (US); Ben Farrell, Barneveld, WI (US)

(73) Assignee: Sheltered Wings, Inc., Barneveld, WI (US)

(*) Notice: Subject to any disclaimer, the term of this patent is extended or adjusted under 35 U.S.C. 154(b) by 0 days.

(21) Appl. No.: 18/192,483

(22) Filed: Mar. 29, 2023

(65) Prior Publication Data

US 2023/0315276 A1    Oct. 5, 2023

Related U.S. Application Data (60) Provisional application No. 63/362,177, filed on Mar. 30, 2022.

(51) Int. Cl.
  *G06F 3/04847*    (2022.01)
  *F41G 3/06*       (2006.01)
  *F41G 3/08*       (2006.01)
  *G01P 13/02*      (2006.01)
  *G06F 3/0346*     (2013.01)

(52) U.S. Cl.
  CPC ......... *G06F 3/04847* (2013.01); *F41G 3/06* (2013.01); *F41G 3/08* (2013.01); *G01P 13/025* (2013.01); *G06F 3/0346* (2013.01)

(58) Field of Classification Search
  CPC ........ G06F 3/0487; G06F 3/0346; F41G 3/06; F41G 3/08; G01P 13/025
  USPC ............................................... 715/765
  See application file for complete search history.

(56) References Cited

U.S. PATENT DOCUMENTS

| | | |
|---|---|---|
| 3,475,821 A | 11/1969 | Huddleston |
| 3,609,299 A | 9/1971 | Wright |
| 3,744,133 A | 7/1973 | Fukushima et al. |
| 5,291,262 A | 3/1994 | Dunne |
| 5,574,552 A | 11/1996 | Dunne |
| 5,914,775 A | 6/1999 | Hargrove et al. |
| 5,920,995 A | 7/1999 | Sammut |
| 6,032,374 A | 3/2000 | Sammut |
| 6,327,806 B1 | 12/2001 | Paige |
| 6,405,107 B1 | 6/2002 | Derman |
| 6,453,595 B1 | 9/2002 | Sammut |
| 6,516,699 B2 | 2/2003 | Sammut et al. |

(Continued)

FOREIGN PATENT DOCUMENTS

| | | |
|---|---|---|
| WO | 2012/121735 A1 | 9/2012 |
| WO | 2016118665 A1 | 7/2016 |

OTHER PUBLICATIONS

International Search Report and Written Opinion issued for International Patent Application No. PCT/US23/16757 dated Jul. 10, 2023, 16 pages.

(Continued)

*Primary Examiner* — William D Titcomb
(74) *Attorney, Agent, or Firm* — Husch Blackwell LLP (57) ABSTRACT

A user interface for displaying and entering a wind bearing comprises a circle or broken circle with one or more markings about its perimeter. The displayed marking or markings correspond to a relative wind direction input by a user. The displayed markings are able to update automatically as the user faces a new direction.

14 Claims, 6 Drawing Sheets

(56) References Cited

U.S. PATENT DOCUMENTS

| | | | |
|---|---|---|---|
| 6,681,512 | B2 | 1/2004 | Sammut |
| 6,873,406 | B1 | 3/2005 | Hines et al. |
| 6,933,859 | B2 | 8/2005 | Hurt et al. |
| 7,516,571 | B2 | 4/2009 | Scrogin et al. |
| 7,603,804 | B2 | 10/2009 | Zaderey et al. |
| 7,654,029 | B2 | 2/2010 | Peters et al. |
| 7,658,031 | B2 | 2/2010 | Cross et al. |
| 7,690,145 | B2 | 4/2010 | Peters et al. |
| 7,746,343 | B1 | 6/2010 | Charaniya et al. |
| 7,832,137 | B2 | 11/2010 | Sammut |
| 7,856,750 | B2 | 12/2010 | Sammut et al. |
| 7,937,878 | B2 | 5/2011 | Sammut et al. |
| 8,046,951 | B2 | 11/2011 | Peters et al. |
| 8,072,581 | B1 | 12/2011 | Breiholz |
| 8,109,029 | B1 | 2/2012 | Sammut et al. |
| 8,172,139 | B1 | 5/2012 | McDonald et al. |
| 8,314,923 | B2 * | 11/2012 | York .............. A63B 71/06 356/5.1 |
| 8,468,930 | B1 | 6/2013 | Bell |
| 8,529,380 | B1 | 9/2013 | Hubenthal et al. |
| 8,650,220 | B2 | 2/2014 | Rohlf et al. |
| 8,713,843 | B2 | 5/2014 | Windauer |
| 9,062,961 | B2 | 6/2015 | Chen et al. |
| 9,151,570 | B2 | 10/2015 | Plaster |
| 9,310,165 | B2 | 4/2016 | Bell et al. |
| 10,415,933 | B1 * | 9/2019 | Kleck ................. F41G 3/06 |
| 10,502,527 | B2 * | 12/2019 | Kleck ................. F41G 3/06 |
| 11,002,514 | B2 | 5/2021 | Hamilton et al. |
| 11,473,874 | B2 * | 10/2022 | Masarik ........... G02B 23/105 |
| 2002/0078618 | A1 * | 6/2002 | Gaber ................. F41G 1/30 42/123 |
| 2005/0021282 | A1 | 1/2005 | Sammut et al. |
| 2005/0268521 | A1 | 12/2005 | Cox et al. |
| 2006/0214935 | A1 | 9/2006 | Boyd et al. |
| 2006/0273932 | A1 | 12/2006 | Wise |
| 2007/0097351 | A1 * | 5/2007 | York ................. F41G 3/06 356/5.02 |
| 2007/0103671 | A1 | 5/2007 | Ash |
| 2008/0202011 | A1 | 8/2008 | Shepherd |
| 2008/0218612 | A1 | 9/2008 | Border et al. |
| 2009/0049733 | A1 * | 2/2009 | Matthews ............ F41G 1/38 42/122 |
| 2009/0266892 | A1 | 10/2009 | Windauer et al. |
| 2010/0117870 | A1 | 5/2010 | Maris |
| 2011/0021293 | A1 * | 1/2011 | York .............. A63B 71/06 473/409 |
| 2011/0132983 | A1 * | 6/2011 | Sammut ............ F41G 1/00 235/404 |
| 2011/0168777 | A1 | 7/2011 | Bay |
| 2011/0296733 | A1 * | 12/2011 | York ................. F41G 1/38 42/130 |
| 2011/0297744 | A1 | 12/2011 | Schneider et al. |
| 2012/0186131 | A1 | 7/2012 | Windauer |
| 2013/0014421 | A1 | 1/2013 | Sammut et al. |
| 2013/0206836 | A1 | 8/2013 | Paterson et al. |
| 2014/0041277 | A1 * | 2/2014 | Hamilton ............ F41G 1/38 42/122 |
| 2014/0115942 | A1 | 5/2014 | Plaster |
| 2015/0055119 | A1 | 2/2015 | Hamilton |
| 2016/0084617 | A1 | 3/2016 | Lyren |
| 2016/0091282 | A1 | 3/2016 | Baker et al. |
| 2017/0176143 | A1 | 6/2017 | Zhang et al. |
| 2018/0172404 | A1 * | 6/2018 | Kleck ................. F41G 3/065 |
| 2019/0094343 | A1 * | 3/2019 | Nyhart ................. G01S 7/51 |
| 2019/0301834 | A1 * | 10/2019 | Hamilton ............ F41G 1/473 |
| 2019/0316881 | A1 * | 10/2019 | Biran .................. G09B 9/003 |
| 2020/0025518 | A1 | 1/2020 | Nackel et al. |
| 2021/0095938 | A1 * | 4/2021 | Clermont ............ F41G 3/06 |
| 2021/0372737 | A1 * | 12/2021 | Masarik ........... G02B 26/0816 |
| 2022/0196366 | A1 * | 6/2022 | Beckman ............ F41G 3/12 |

OTHER PUBLICATIONS

International Preliminary Report on Patentability for International Application No. PCT/US2023/016757 mailed Oct. 10, 2024, 9 pages.
Draft Petition for Post Grant Review of U.S. Pat. No. 11,002,514 received from Gunwerks LLC, 115 pages.
Draft Declaration of John H. Lupher in Support of Petition for Post Grant Review of U.S. Pat. No. 11,002,514 received from Gunwerks LLC, 102 pages.
International Search Report and Written Opinion for PCT/US14/52161 dated Dec. 2, 2014, 7 pages.
International Preliminary Report on Patentability for PCT/US2019/027535 dated Oct. 13, 2020, 7 pages.
International Search Report and Written Opinion for PCT/US2019/027535 dated Jul. 2, 2019, 8 pages.

* cited by examiner

USER INTERFACE FOR VIEWING OPTIC WITH WIND DIRECTION CAPTURE

CROSS REFERENCE TO RELATED APPLICATIONS

This application is a non-provisional application of and claims priority to U.S. Provisional Patent Application No. 63/362,177 filed Mar. 30, 2022, which is incorporated herein by reference in its entirety.

FIELD

The disclosure relates to a user interface for entering wind direction and speed information, and more particularly to a user interface for entering wind direction and speed information for use with a ballistics calculator. In another embodiment, the disclosure relates to a viewing optic with a user interface for entering wind direction and speed information.

BACKGROUND

Ballistics calculators, whether incorporated into a rangefinder or accessed via a device connected to a network, require a user to either manually input wind direction (and sometime windspeed) or use a second device to measure wind direction and/or speed. Manually inputting the wind direction and/or speed into a viewing optic is very cumbersome and highly inaccurate. The speed and direction of the wind are particularly key factors in calculating a ballistics solution. User interfaces vary by device, and the proper screens can be buried deep in the menu selections. Just as important is the timeliness of inputting this information before wind direction changes or the target moves.

Generally, wind direction is observed and/or measured on a first device, then manually inputted into the ballistics calculator. For example, consider a hunter trying to shoot a deer at 750 yards. The hunter gets a ballistic solution based on 8-mph winds at 75° relative to the hunter, and this data was previously inputted. Just prior to pulling the trigger, the wind changes direction and is now 130° relative to the hunter. If the hunter had to manually input wind direction again by cycling through multiple menus and then updating the wind information, there is a good chance the hunter will not be able to take his/her shot.

Wind direction is generally also input relative to the current target and needs to be updated if the direction of fire is changed. For example, consider a hunter who is aiming at a deer that is North of his location and enters the wind information from a wind coming from the East. The hunter then spots a deer that is due East of his location that he wishes to shoot. The hunter would need to update the wind direction as it is no longer to the hunter's right, but from behind the hunter. This again can be problematic due to the time and stress involved in the situation faced by the hunter.

Wind direction is only one factor used by ballistics calculators to determine a bullet's trajectory. Additional environmental factors, such as barometric pressure, humidity, and temperature also affect a bullet's trajectory. In many instances, a user must carry multiple instruments in order to capture the environmental data desired to be inputted into a ballistics calculator to generate a more complete ballistic trajectory.

The same scenario(s) can also be applied to competition shooting, in which each shooter s timed on his/her shots and must make quick adjustments. Prior to taking a shot, the shooter quickly enters all environmental parameters. Typically, wind direction and speed are the only parameters that are not directly inputted into the ballistics calculator. Therefore, the shooter must quickly input them and set up to shoot the target. If the wind changes direction or speed just prior to taking the shot, the shooter will need to input new wind data into the ballistics calculator. The same is true if the shooter wishes to engage a target in a different direction than a previous target.

In order for the shooter to understand the wind direction, the display must be very intuitive. Currently, it is common to report wind and target directions as a compass heading, for example a 270° wind is a wind that is blowing from West to East. The shooter must be aware of which direction is North to intuitively know if the wind is entered correctly. It can also be difficult to quickly know which direction a compass heading is, for example 237°.

Another common method for entry of wind direction is the clock method, where the wind entries are broken up into 12 segments and thought of as a clock. For example a 3:00 wind is a wind from the shooters right. While this is an intuitive method to understand wind direction relative to the shooter, it is only valid for the current shot conditions and does not translate well to intuitively understanding other possible orientations for future shots.

The following is an example of the steps required to input wind information:

(1) Determine wind direction (absolute bearing) and wind speed, e.g., using one or more devices external to the a ballistics calculator;
(2) Press and hold a specified button for a pre-programmed amount of time to have the necessary menu displayed;
(3) Press a specified button to navigate through the menu options to a further menu which allows the user to modify wind direction;
(4) Press a specified button to change wind direction (absolute bearing), e.g., using standard clock hour values from 1:00 to 12:00 with each hour representing a 30° segment of a 360° circle;
(5) Press a specified button to navigate to the menu that allows you to modify the wind speed;
(6) Press a specified button to input wind speed, e.g., by pressing a specified increase or decrease button until the value displayed is the desired wind speed;
(7) Press and hold a specified button for a pre-programmed amount of time to exit the menu; and
(8) Press a specified button to take a range.

As outlined above, ballistic calculators require the user to navigate multiple menus to input the wind direction and speed and/or use multiple instruments to obtain the information necessary to complete a ballistic calculation. Thus, a need still exists for an intuitive user interface. A further need exists for a viewing optic with an intuitive user interface for entering data to the ballistics calculator.

SUMMARY

In one embodiment, the disclosure provides a user interface for a viewing optic. In an embodiment, the user interface is in accordance with any embodiment or combination of embodiments shown and described herein.

In an embodiment, the user interface is configured to be displayed on a viewing optic, a rangefinder, a ballistic calculator, a computer, a mobile device, and combinations thereof.

In an embodiment, the user interface is configured to display wind direction information input into a ballistic calculator. In a further embodiment, the user interface is configured to display wind speed information input into a ballistic calculator.

In an embodiment, the user interface comprises a circle or broken circle and a plurality of marks spaced about the perimeter of the circle or broken circle. In an embodiment, the circle is a broken circle. In an embodiment, the marks are triangular. In a further embodiment, the marks are positioned at about 30° intervals about the perimeter of the circle or broken circle.

In one embodiment, the marks correspond to wind direction. In one embodiment, a mark illuminates when corresponding to wind direction. In one embodiment, the marks are configured to sense direction of wind and luminate as the user faces a new direction to provide visual feedback of the wind relative to a compass heading.

In one embodiment, a user interface is configured to display wind direction. In another embodiment, a user interface is configured to automatically display wind direction based on a change in orientation. In another embodiment, a user interface is configured to automatically display wind direction based on a change in a compass heading.

In one embodiment, the disclosure relates to a viewing optic having a user interface configured to display wind direction, and configured to automatically display wind direction based on change in orientation of the viewing optic by a user.

In one embodiment, the disclosure relates to a ballistic calculator. In an embodiment, the ballistic calculator comprises a user interface in accordance with any embodiment or combination of embodiments shown and described herein.

In one embodiment, the disclosure relates to a viewing optic. In an embodiment, the viewing optic comprises a user interface in accordance with any embodiment or combination of embodiments shown and described herein.

In one embodiment, the disclosure relates to a viewing optic comprising: a body, the body including a user interface as disclosed herein; a ranging system for measuring a distance to a target and mounted within the body; a direction sensor mounted within the body and configured to determine direction of wind, and also configured to determine the direction of a target upon activation of the ranging system and in relation to the determined wind direction; and a processor mounted within the body and capable of controlling information for showing on the user interface. In one embodiment, the user interface comprises a circle or broken circle and a plurality of marks spaced about the perimeter of the circle or broken circle.

In one embodiment, the disclosure relates to a viewing optic comprising: a body, the body including a user interface as disclosed herein; a ranging system for measuring a distance to a target and mounted within the body; a direction sensor mounted within the body for determining direction of wind and direction of the target; and a processor mounted within the body and capable of controlling information for showing on the user interface. In one embodiment, the user interface comprises a circle or broken circle and a plurality of marks spaced about the perimeter of the circle or broken circle.

In one embodiment, the disclosure related to a rangefinder comprising: a body, the body having a user interface as disclosed herein; a ranging system for measuring the distance to a target and mounted within the body, a direction sensor mounted within the body for determining direction of wind and direction of the target; a processor mounted within the body and in communication with the ranging system and the direction sensor, the processor having a ballistics computer program that uses the distance from the ranging system, the wind direction and the direction of the target from the direction sensor to determine a ballistic trajectory. In one embodiment, the user interface comprises a circle or broken circle and a plurality of marks spaced about the perimeter of the circle or broken circle.

In one embodiment, the disclosure provides a method of entering wind direction information into a ballistic calculator. In an embodiment, the method of entering wind direction information into a ballistic calculator is in accordance with any embodiment or combination of embodiments shown and described herein.

In one embodiment, the disclosure relates to a method comprising setting wind direction using a user interface of a viewing optic or laser rangefinder; displaying wind direction based on a change in direction of the viewing optic or laser rangefinder.

In one embodiment, the disclosure relates to a method comprising setting wind direction using a user interface of a viewing optic or laser rangefinder; and updating and displaying wind direction as a user of the viewing optic or laser rangefinder changes heading.

In one embodiment, the disclosure relates to a method comprising displaying wind direction on a user interface of a viewing optic or laser rangefinder as a user changes heading.

In one embodiment, the disclosure relates to a method comprising continuously displaying wind direction on a user interface of a viewing optic or laser rangefinder as a user changes heading.

In an embodiment, a method of entering wind direction information into a ballistic calculator comprises displaying on a user interface a wind bearing capture interface comprising a circle or broken circle and at least one mark at a position on the perimeter of the circle or broken circle; and activating an input device to either (i) change the position of the at least one mark on the perimeter of the circle or broken circle, or (ii) display a second mark at a second position on the perimeter of the circle or broken circle.

In an embodiment, the disclosure relates to a method comprising displaying on a user interface a wind bearing capture interface comprising a circle or broken circle and at least one mark at a position on the perimeter of the circle or broken circle; and activating an input device to either (i) change the position of the at least one mark on the perimeter of the circle or broken circle, or (ii) display a second mark at a second position on the perimeter of the circle or broken circle; and displaying wind direction on the user interface as the user faces a new direction or changes compass heading.

In another embodiment, the method comprises a second step of activating an input device to either (i) change the position of the at least one mark on the perimeter of the circle or broken circle, or (ii) hide one of the at least one mark and the second mark. In a further embodiment, the method comprises repeating the step of activating an input device until the at least one mark corresponds to a desired wind direction or until the at least one mark and the second mark together correspond to the desired wind direction. In an embodiment, the method further comprises accessing a wind bearing capture mode before displaying the wind bearing capture interface.

In an embodiment, the disclosure relates to a method comprising displaying on a user interface a wind bearing capture interface comprising a circle or broken circle and a plurality of marks at a position on the perimeter of the circle or broken circle; wherein the plurality of marks correspond to wind direction; setting wind direction to correspond to one of the plurality of marks; and illuminating and displaying a new mark of the plurality of marks that corresponds to wind direction on the user interface based on change in direction or compass heading.

In an embodiment, the disclosure relates to a method comprising displaying on a user interface a wind bearing capture interface comprising a circle or broken circle and a plurality of marks at a position on the perimeter of the circle or broken circle; wherein the plurality of marks correspond to wind direction; setting wind direction to correspond to one of the plurality of marks and illuminating the one of the plurality of marks; and illuminating and displaying a new mark of the plurality of marks that corresponds to wind direction on the user interface based on change in direction or compass heading. The wind direction has not changed but the orientation or heading of the user has changed (see FIGS. 6A and 6B) as such a new mark corresponding to wind direction is illuminated.

In one embodiment, the disclosure relates to a method of calculating a ballistic trajectory comprising: pointing a viewing optic in a direction corresponding to a direction from which wind originates; the viewing optic having a body, wherein the body has a user interface as disclosed herein, a direction sensor mounted within the body, and a processor in communication with the direction sensor and having a ballistics program; capturing the wind direction by activating the direction sensor; communicating the wind direction to the processor; and using the ballistics program to determine a ballistic trajectory.

In one embodiment, the plurality of marks include at least 2 marks, 3 marks, 4 marks, 5 marks, marks, 7 marks, 8 marks, 9 marks, 10 marks, 11 marks, 12 marks, 13 marks, 14 marks, 15, marks, 16 marks, 17 marks, 18 marks, 19 marks, 20 marks or more than 20 marks. In one embodiment, the multiple marks include from 2 marks to 12 marks. In one embodiment, the plurality of marks include at least 12 marks. In one embodiment, the plurality of marks include no more than 30 marks. In yet another embodiment, the plurality of marks include no more than 24 marks. In yet another embodiment, the plurality of marks include no more than 18 marks.

In another embodiment, the marks are able to sense the direction and luminate and conceal as the user faces a new direction to provide visual feedback of the entry relative to a compass heading.

In another embodiment, the method further comprises displaying on the user interface a wind speed capture interface comprising a numerical representation of a wind speed; and activating an input device to change the wind speed to a desired wind speed.

Other embodiments will be evident from a consideration of the drawings taken together with the detailed description provided herein.

BRIEF DESCRIPTION OF THE DRAWINGS

Embodiments of the disclosure are disclosed with reference to the accompanying drawings and are for illustrative purposes only. The disclosure is not limited in its application to the details of construction or the arrangement of the components illustrated in the drawings. The disclosure is capable of other embodiments or of being practiced or carried out in other various ways. Like reference numerals are used to indicate like components. In the drawings.

Before explaining embodiments of the disclosure in detail, it is to be understood that the disclosure is not limited in its application to the details of construction and the arrangement of the components set forth in the following description or illustrated in the drawings. The technology of this present disclosure is capable of other embodiments or being practiced or carried out in various ways. Also, it is to be understood that the phraseology and terminology employed herein is for the purpose of description and should not be regarded as limiting.

DETAILED DESCRIPTION

The apparatuses and methods disclosed herein will now be described more fully hereinafter with reference to the accompanying drawings, in which embodiments of the disclosure are shown. The apparatuses and methods disclosed herein may, however, be embodied in many different forms and should not be construed as limited to the embodiments set forth herein. Rather, these embodiments are provided so that the disclosure will be thorough and complete and will fully convey the scope of the invention to those skilled in the art.

It will be appreciated by those skilled in the art that the set of features and/or capabilities may be readily adapted within the context of a standalone viewing optic, such as a weapons sight, front-mount or rear-mount clip-on weapons sight, and other permutations of field deployed optical weapons sights. Further, it will be appreciated by those skilled in the art that various combinations of features and capabilities may be incorporated into add-on modules for retrofitting existing fixed or variable viewing optics of any variety.

The numerical ranges in this disclosure are approximate, and thus may include values outside of the range unless otherwise indicated. Numerical ranges include all values from and including the lower and the upper values (unless specifically stated otherwise), in increments of one unit, provided that there is a separation of at least two units between any lower value and any higher value. As an example, if a compositional, physical or other property, such as, for example, distance, speed, velocity, etc., is from 10 to 100, it is intended that all individual values, such as 10, 11, 12, etc., and sub ranges, such as 10 to 44, 55 to 70, 97 to 100, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, distances from a user of a device to a target.

Spatial terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of device in use or operation in addition to the orientation depicted in the figures. For example, if the device is turned over, elements described as "below" or "beneath" other elements or features would then be orientated "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the term "and/or" includes any and all combinations of one or more of the associated listed terms. For example, when used in a phrase such as "A and/or B," the phrase "and/or" is intended to include both A and B; A or B; A (alone); and B (alone). Likewise, the term "and/or" as used in a phrase such as "A, B and/or C" is intended to encompass each of the following embodiments: A, B and C; A, B, or C; A or C; A or B; B or C; A and C; A and B; B and C; A (alone); B (alone); and C (alone).

It will be understood that when an element or layer is referred to as being "on," "connected to," or "coupled to" another element or layer, it can be directly on, connected to or coupled to the other element or layer. Alternatively, intervening elements or layers may be present. In contrast, when an element or layer is referred to as being "directly on," "directly connected to," or "directly coupled to" another element or layer, there are no intervening elements or layers present.

As used herein, the term "anemometer" refers to an instrument for measuring the force, velocity and, in some embodiments, direction, of wind. Anemometers include, but are not limited to, impeller-type anemometers, ultrasonic anemometers, hot wire anemometers, pressure tube anemometers, cup anemometers, and laser Doppler anemometers.

As used herein, the term "ballistics" refers to the field of mechanics that deals with the launching, flight, behavior and effects of projectiles, especially bullets, unguided bombs, rockets, or the like, as well as the science or art of designing and accelerating projectiles so as to achieve a desired performance.

As used herein, the term "ballistics calculator" refers to a computer program that provides the user/shooter/spotter a solution for the trajectory of a projectile. In one embodiment, a ballistics calculator is used to produce a corrected aim point for the projectile. A ballistics calculator can be provided as part (and integrated with) a viewing optic, provided remotely and accessed by a connection to a network, or provided as a secondary device connectable (physically or wirelessly) to a viewing optic. As used herein, the terms "ballistics calculator" and "ballistics computer program" are used interchangeably.

As used herein, the term "bullet" refers to a projectile for firing from a firearm, such as a rifle or revolver, typically made of metal, cylindrical and pointed. A bullet may sometimes contain an explosive.

As used herein, the terms "computer memory" and "computer memory device" refer to any storage media readable by a computer processor. Examples of computer memory include, but are not limited to, RAM, ROM, computer chips, digital video disc (DVDs), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, memory chip, magnetic tape and servers for streaming media over networks.

As used herein, the terms "processor" and "central processing unit" or "CPU" are used interchangeably and refer to a device that is able to read a program from a computer memory (e.g., ROM or other computer memory) and perform a set of steps according to the program.

As used herein, the term "direction sensor" refers to a device, instrument or assembly used for orientation of a device to which the direction sensor is connected or integrated in relation to cardinal directions. In an embodiment, a direction sensor is a compass.

As used herein, the term "firearm" refers to a portable gun, being a barreled weapon that launches one or more projectiles often driven by the action of an explosive force. Exemplary firearms include, but are not limited to, handguns, long guns, rifles, shotguns, carbines, automatic weapons, semi-automatic weapons, machine guns, sub-machine guns, automatic rifles, and assault rifles.

As used herein, the term "laser rangefinder" refers to a device or assembly that uses a laser beam to determine the distance to a target object.

As used herein, the term "user" refers to either the operator making the shot or an individual observing the shot in collaboration with the operator making the shot.

As used herein, the term "viewing optic" refers to an apparatus or assembly used by a user, a shooter or a spotter to select, identify and/or monitor a target. A viewing optic may rely on visual observation of the target or, for example, on infrared (IR), ultraviolet (UV), radar, thermal, microwave, magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to a user/shooter/spotter by a viewing optic may be unaltered, or it may be enhanced, for example, by magnification, amplification, subtraction, superimposition, filtration, stabilization, template matching, or other means. The target selected, identified and/or monitored by a viewing optic may be within the line of sight of the shooter or tangential to the sight of the shooter. In other embodiments, the shooter's line of sight may be obstructed while the viewing optic presents a focused image of the target. The image of the target acquired by the viewing optic may, for example, be analog or digital, and shared, stored archived or transmitted within a network of one or more shooters and spotters by, for example, video, physical cable or wire, IR, radio wave, cellular connections, laser pulse, optical 802.11b or other wireless transmission using, for example, protocols such as html. SML, SOAP, X.25, SNA, etc., Bluetooth™, Serial, USB or other suitable image distribution method. In one embodiment, the viewing optic includes but is not limited to a monocular, a binocular, a spotting scope, a riflescope, a red dot sight, or a rangefinder.

The apparatus and methods disclosed herein relate to a viewing optic. In one embodiment, the viewing optic has a body, and a direction sensor for determining direction of wind mounted within the body. In one embodiment, the direction sensor is coupled to the viewing optic. In one embodiment, the direction sensor is directly or indirectly coupled to the viewing optic. In one embodiment, the direction sensor is integrated into the viewing optic. In one embodiment, the direction sensor is a compass having a 3-axis accelerometer, and a 3-axis magnetometer.

In one embodiment, the apparatus and methods disclosed herein relate to a viewing optic with rangefinding capabilities. In one embodiment, the viewing optic disclosed herein can determine one or more variables that affect the trajectory of a projectile. In one embodiment, the viewing optic disclosed herein can determine range to target information and can automatically determine barometric pressure, ambient temperature, and relative humidity and provides a convenient method for determining wind direction.

In one embodiment, the viewing optic has a range finding system for determining range to target information; a wind direction sensor for determining wind direction, and a processor in communication with the range finding system and the wind direction sensor and having a ballistics computer program, wherein the ballistics computer program uses the range and wind direction to determine trajectory of a projectile. In one embodiment, the ballistics computer program can calculate a corrected aim point.

Figure 1:
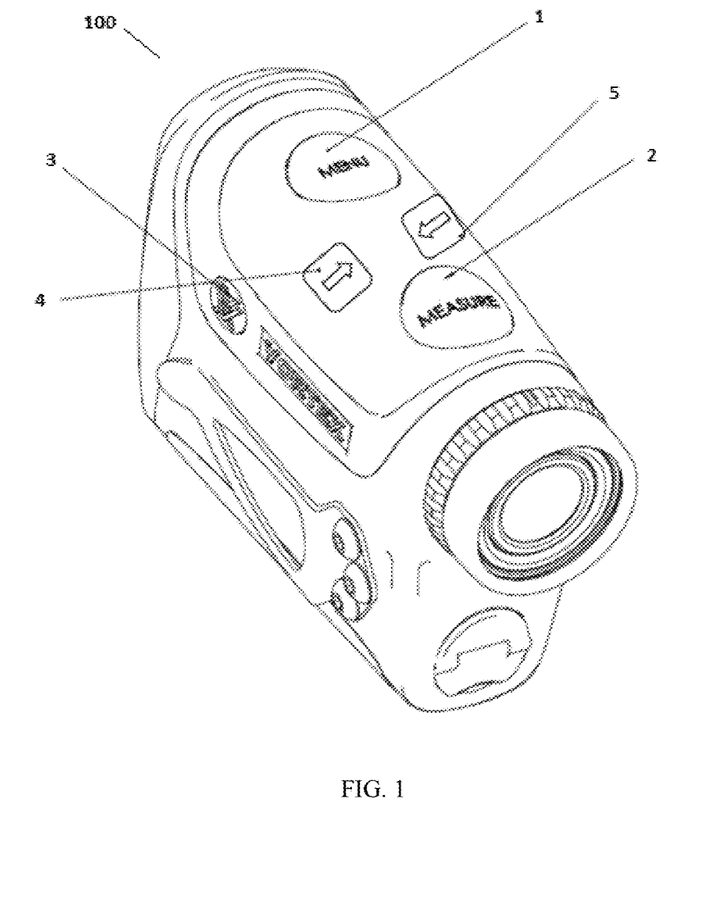
FIG. 1 is an isometric view of an exemplary viewing optic, which is a rangefinding monocular, incorporating wind direction capture functionality in accordance with embodiments of the disclosure.

FIG. 1 is an isometric view of an exemplary viewing optic 100, which is a rangefinding monocular, incorporating wind direction capture functionality in accordance with embodiments of the disclosure. In one embodiment, the viewing optic 100 has a body, the body having a direction sensor that can determine wind direction without requiring a user to input a variable into the system. The direction sensor can automatically determine the direction of wind. In one embodiment, the viewing optic 100 uses a direction sensor to determine the direction of the wind based on the location of the viewing optic 100. In one embodiment, the viewing optic 100 can have a display.

In the embodiment shown, the viewing optic 100 includes a menu button 1, a measure button 2, a wind capture button 3, and first and second selection buttons 4, 5, respectively. The viewing optic 100 further includes onboard rangefinder functionality. The menu button 1 allows a user to access the onboard rangefinder functionality and, for example, enter and/or exit various modes. The measure button 2 is used to fire the laser in order to obtain a range to an intended target. The wind capture button 3 is used to enter and/or exit a mode, which permits the capture of the wind direction and/or capture the wind speed. The first and second selection buttons 4, 5 allow users to navigate through menus and/or, when in wind capture mode, to increase and/or decrease, wind speed. In one embodiment, the first and second selection buttons 4, 5 permit a user to increase and/or decrease wind speed regardless of the mode of the onboard rangefinder.

In one embodiment, upon activation of measure button 2, the direction sensor can determine the direction to a target.

In one embodiment, the types of variables and features that may be adjusted in menu mode include, but are not limited to, the profile, wind speed, ballistic coefficient, muzzle velocity, drag standard, sight height and zero range.

In some embodiments, the parameters of the viewing optic that can be adjusted or for which data can be entered could be classified as menu options and menu selections. For example, menu option could be the parameter or variable itself, such as range units, or ballistic coefficient as examples. Menu selection would then be the selected value or data input for that parameter, and could be provided by scrolling or clicking through options that could be selected, or could even be entered manually into the viewing optic itself or through data input from another device. In one embodiment, the menu option allows for the selection of range units, and the user can choose from menu selections for yards or meters.

Figure 2:
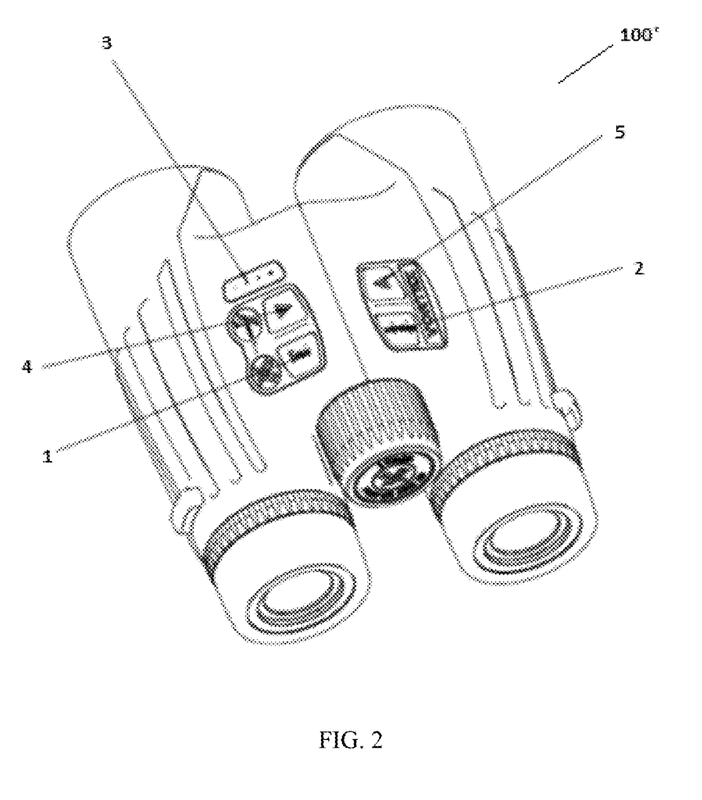
FIG. 2 is an isometric view of an exemplary viewing optic, which is a rangefinding binocular, incorporating wind direction capture functionality in accordance with embodiments of the disclosure.

FIG. 2 is an isometric view of an exemplary viewing optic 100', which is a rangefinding binocular, incorporating wind direction capture functionality in accordance with embodiments of the disclosure. Like the rangefinding monocular 100, the binocular 100' also has an onboard ballistics calculator (such as described above), a menu button 1, a measure button 2, a wind capture button 3, and first and second selection buttons 4, 5, respectively. The menu button 1 allows a user to access the onboard rangefinder functionality and, for example, enter and/or exit various modes. The measure button 2 is used to fire the laser in order to obtain a range to an intended target. The wind capture button 3 is used to enter and/or exit a mode, which permits the capture of the wind direction and/or capture the wind speed. The first and second selection buttons 4, 5 allow users to navigate through menus and/or, when in wind capture mode, to increase and/or decrease, wind speed. In one embodiment, the first and second selection buttons 4, 5 permit a user to increase and/or decrease wind speed regardless of the mode of the onboard rangefinder.

In an embodiment, a viewing optic 100/100' further includes an integrated direction sensor, such as a compass (not shown). The direction sensor may be independent from the ballistics calculator or, in further embodiments, in communication (either directly or indirectly) with the ballistics calculator. In the particular embodiments shown, the direction sensor is operatively coupled to the wind capture button 3. Activation of the wind capture button 3 causes the wind direction to be measured and/or captured.

In one embodiment, the direction sensor is a compass having a 6-axis integrated linear accelerometer and magnetometer. In one embodiment, the direction sensor is a compass having a 3-axis accelerometer and a 3-axis magnetometer.

In one embodiment, upon activation of the range measure button 2, the direction sensor can also determine the direction to the target. In one embodiment, the direction sensor determines the direction to the target when the ranging system is activated. In one embodiment, the direction of the target is computed against the captured wind direction.

In one embodiment, the direction sensor determines the direction to the target in relation to the direction of the captured wind, which can be stored in one or more memory devices.

In an embodiment, a viewing optic 100/100' further includes a ranging system (not shown). A standard ranging system uses a laser beam to determine the distance to an object or to a target, and operates by sending a laser pulse towards target and measuring the time taken by the pulse to be reflected off the target and returned. In general terms, a laser pulse is emitted from a transmitter, such as a pulse laser diode. Part of the beam emitted travels through a beam splitter, and part is reflected to detector. The emitted laser pulse travels through a transmission lens to target, which reflects a portion of the laser pulse back through receiving lens and subsequently through receiver to a micro-controller unit, which calculates the distance to target using well-known mathematical principles. Ranging system could also be a more complex system with additional or alternative components, including gain control components, charging capacitors, and analog to digital converters by way of example.

In an embodiment, the viewing optic 100/100' further includes at least one sensor of an anemometer, a barometric pressure sensor, a humidity sensor, and a temperature sensor. In a preferred embodiment, the viewing optic 100/100' includes at least one, at least two, at least three, or all four of an anemometer, a barometric pressure sensor, a humidity sensor, and a temperature sensor. These sensors are operatively coupled to the ballistic calculator such that the ballistics calculator can utilize the data captured by the one or more sensors in determining a bullet trajectory.

In a further embodiment, the one or more sensors are operatively coupled to a memory device. The memory device stores the data captured by the one or more sensors.

In still a further embodiment, the one or more sensors are operatively coupled to the user interface so that the data captured by the one or more sensors is capable of being displayed.

In one embodiment, ballistic parameters associated with temperature, barometric pressure, humidity, altitude and ambient light conditions are sensed by a thermometer, barometer, hygrometer, altimeter, and light meter, respectively. The digital readings sensed from each of these digital ballistic parameter instruments are also configured to be transmitted (e.g., in real time) to a processor having a ballistics computer program.

In one embodiment, the viewing optic can have an inertial navigation unit including but not limited to a 3-axis compass, a 3-axis accelerometer, and a 3-axis gyroscope. In other embodiments, the 3-axis compass, a 3-axis accelerometer, and a 3-axis gyroscope can be incorporated into the viewing optic 100/100' as individual components, with appropriate software, instead of being incorporated into the viewing optic 100/100' as an integral unit. And in still other embodiments, the gyroscope can be omitted. Further, other tilt sensors can be used in place of the accelerometer. Examples of other tilt sensors include an electrolytic liquid level tilt sensor, an optical bubble tilt sensor, a capacitive bubble tilt sensor, a pendulum mechanism, a rotary optical encoder, a rotary electro-resistive encoder, a Hall Effect device, and a ceramic capacitive tilt sensor.

In one embodiment, the viewing optic 100/100' has a processor or a computing device containing a ballistics calculator or ballistics computer program that the user can access using one or more buttons operatively connected to the ballistics calculator to determine a projectile's trajectory based on one or more factors such as projectile weight, distance to target and environmental factors (such as, for example, wind speed and wind direction).

In one embodiment, the ballistics calculator computes a ballistics solution using two variables obtained from the direction sensor: (1) direction the wind originates; and (2) direction to the target. In one embodiment, the direction to the target is captured at the same time the distance to the target is determined by the ranging system. In one embodiment, the direction to the target is computed against the captured wind direction.

In one embodiment, the processor containing a ballistics calculator program can receive one or more aspects of ballistics data including but not limited to information regarding external field conditions (for example, date, time, temperature, relative humidity, target image resolution, barometric pressure, wind speed, wind direction, hemisphere, latitude, longitude, altitude), firearm information (for example, rate and direction of barrel twist, internal barrel diameter, internal barrel caliber, and barrel length), projectile information (for example, projectile weight, projectile diameter, projectile caliber, projectile cross-sectional density, one or more projectile ballistic coefficients (as used herein, "ballistic coefficient" is as exemplified by William Davis, American Rifleman, March, 1989, incorporated herein by reference), projectile configuration, propellant type, propellant amount, propellant potential force, primer, and muzzle velocity of the cartridge), target acquisition device and reticle information (for example, type of reticle, power of magnification, first, second or fixed plane of function, distance between the target acquisition device and the barrel, the positional relation between the target acquisition device and the barrel, the range at which the telescopic gunsight was zeroed using a specific firearm and cartridge), information regarding the shooter (for example, the shooter's visual acuity, visual idiosyncrasies, heart rate and rhythm, respiratory rate, blood oxygen saturation, muscle activity, brain wave activity, and number and positional coordinates of spotters assisting the shooter), and the relation between the shooter and target (for example, the distance between the shooter and target, the speed and direction of movement of the target relative to the shooter, or shooter relative to the target (e.g., where the shooter is in a moving vehicle), and direction from true North), and the angle of the rifle barrel with respect to a line drawn perpendicularly to the force of gravity).

In an embodiment, the viewing optic 100, and particularly the ballistics calculator, has at least two user-selected modes, including but not limited to a "ballistics" mode. Ballistics calculations are extremely important to shooters at distances beyond 500 yards. At these distances, the effects of gravity, bullet characteristics, gun characteristics, temperature, barometric pressure, relative humidity, wind direction, and wind velocity have a greater impact on the overall trajectory of the bullet.

In one embodiment, the processor can also be fed wind data, temperature data and other environmental field data from a remote sensing device. In one embodiment, the remote sensing device may be wirelessly linked to the processor. The processor may determine one or more ballistic parameters from the data gathered from the range finder and an inclinometer and the remote sensing device and then calculate the required Point of Aim (POA) to Point of Impact (POI) adjustment based on these ballistic parameter(s). The processor may then transmit a data signal representative of the required or desired vertical and windage adjustment for the POA to POI adjustment to a display. As described herein, such communication of the signal between the processor and the display may be achieved by either a wire-based link or a wireless link.

In an embodiment, a viewing optic 100/100' further includes a memory device (not shown). A memory device may be internal to, so as to be contained within, the viewing optic 100/100' or external to and in communication (either wired or wireless) with the viewing optic 100/100'. In such embodiments, the memory device is operatively connected to both the direction sensor and the ballistics calculator. In embodiments, the connection with the direction sensor and/or ballistics calculator may be wired or utilize wireless communication technologies. In embodiments having a memory device, the captured wind direction data may be stored in the memory device and accessible to the ballistics calculator.

Furthermore, with the wind direction captured and stored, the user can continuously range targets and have a wind corrected ballistics solution, unless the wind direction or speed changes. However, if the wind is steady, the user only has to range a new target, which provides a simple and efficient process to obtain a wind corrected ballistics solution.

In an embodiment, a viewing optic 100/100' includes a display. The display may be integrated within the sight of the viewing optic 100/100' or visible on the exterior of the viewing optic 100/100'. In still further embodiments, the display may be a separate component from the viewing optic 100/100', such as a computer, tablet, mobile phone, television or other device, and in communication with the viewing optic 100/100'. The display is configured to show various information, including menu options and ballistics data.

In a particular embodiment, the display is configured to display the distance to a target. For example, when a viewing optic 100/100' includes laser rangefinder functionality, as described above and with particular reference to measure button 2, the ballistics computer will calculate the distance to a target. When the measure button 2 is activated (e.g., pushed), the viewing optic 100/100' will emit a laser beam which the user directs toward a desired target. The laser beam reflects off the target and back to the viewing optic 100/100'. The ballistics computer calculates the distance from the viewing optic 100/100' to the target based on the signal strength and time it took to receive the reflected beam.

In a further embodiment, the viewing optic 100/100' includes an inclinometer. In such embodiment, the display may be configured to display the elevation angle of a target.

It will be appreciated that the specific shape, arrangement and physical design of the buttons 1-5 described herein may vary, provided the buttons 1-5 are operatively connected to the onboard rangefinder system(s) to permit functionality.

In an embodiment, the viewing optic 100/100' assists a user in compensating for wind direction and velocity.

As set forth above, wind direction and velocity can have a significant effect on bullet trajectory. Additionally, barometric pressure, ambient temperature, and relative humidity also affect trajectory. While the range from the shooter to the target is often a crucial factor, each of the environmental factors listed above can greatly influence trajectory. The table below illustrates the effects of changing some of these parameters by 10%.

Indeed, Table 1 shows that changing the range to the target has the greatest influence on trajectory, followed by barometric pressure and wind speed. For example, when using a particular firearm, with a given ammunition and a consistent target at 1,000 yards, the wind direction and velocity can greatly impact the travel of the bullet even up to 80 inches or more. By way of specific example, the following values show the effect wind can have on bullet trajectory based on a user shooting at a target at 1,000 yards with a Winchester .308 rifle, Hornaday ELD-X 178 grain bullet, rifle zero range of 100 yards, muzzle velocity of 2,650 feet per second, 29.08 in Hg barometric pressure, 70° F. temperature and 60% relative humidity:

(1) Wind direction is 0° relative to the target, at a speed of 0 miles per hour (mph)—the bullet will drop approximately 357 inches and move to the left approximate 6 inches.

(2) Wind direction is 90° relative to the target, at a speed of 10 mph—the bullet will drop approximately 357 inches and move to the left approximately 75 inches.

(3) Wind direction is 40° relative to the target, at a speed of 10 mph—the bullet will drop approximately 359 inches and move to the left approximately 47 inches.

The above scenarios show just how much a 10 mph wind affects bullet trajectory when coming from different directions. It will be appreciated that the greater the distance to the target, the greater the effect of the wind on bullet trajectory.

Figure 3:
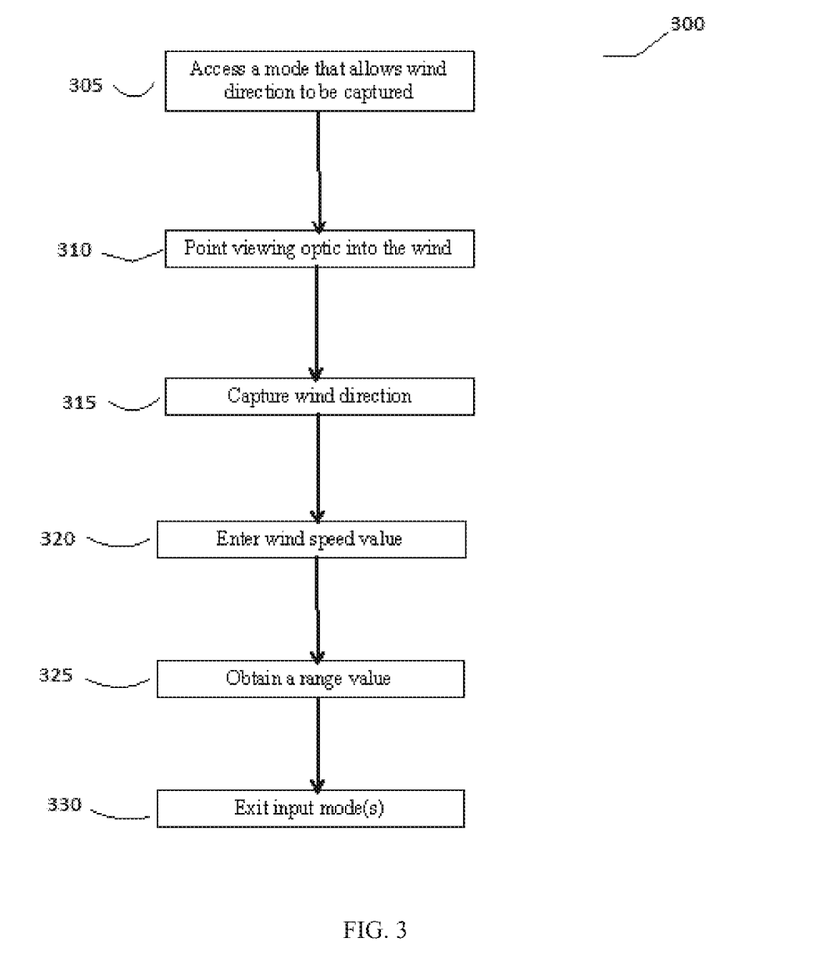
FIG. 3 illustrates an exemplary method of using a viewing optic in accordance with embodiments of the disclosure.

FIG. 3 illustrates an exemplary method 300 of inputting wind speed coming from a direction into a viewing optic in accordance with embodiments of the present disclosure.

First, the user selects a mode that allows wind direction to be captured using a direction sensor. In an embodiment, the step of accessing the mode 305 includes pressing and holding a button (or pressing a specific sequence of buttons) to enter a mode that will allow the wind direction to be captured using the direction sensor. In an embodiment, the specified button is a wind capture button 3 as described herein. In an embodiment, the step of pressing and holding the specified button 305 includes pressing and holding the specified button for a specified time, e.g., from 3 to 6 seconds, and more preferably from 3 to 5 seconds. To note, step 305 may not be necessary if the wind capture mode is already accessed.

Next, the viewing optic is pointed in the direction the wind is coming from (step 310).

Once the viewing optic is in the proper mode and pointed in the proper direction, the user presses a button to capture

TABLE 1

| .308 Winchester, 178 gr Hornady ELD-X, G1 | | | | | | | |
|---|---|---|---|---|---|---|---|
| Range (yds) | 1,000 | 1,100 | 1,000 | 1,000 | 1,000 | 1,000 | 1,000 |
| Wind Direction (°) | 70 | 70 | 77 | 70 | 70 | 70 | 70 |
| Wind Speed (mph) | 20 | 20 | 20 | 22 | 20 | 20 | 20 |
| Temperature (° F.) | 70 | 70 | 70 | 70 | 77 | 70 | 70 |
| Pressure (inHg) | 29.08 | 29.08 | 29.08 | 29.08 | 29.08 | 31.988 | 29.08 |
| Humidity (%) | 60 | 60 | 60 | 60 | 60 | 60 | 66 |
| Bullet Drop (in) | 359 | 467 | 358 | 359 | 356 | 383 | 359 |
| Bullet Lateral Movement (in) | 148 | 184 | 153 | 163 | 145 | 168 | 147 |
| Bullet Drop Difference (in) | NA | 108 | 1 | 0 | 3 | 24 | 0 |
| Δ Bullet Lateral Movement (in) | NA | 36 | 5 | 15 | 3 | 20 | 1 | the wind direction (step 315). In an embodiment, the button may be the same as the specified button of step 305. In a further embodiment, the button is a wind capture button 3 as described herein. In an embodiment, the step of pressing a button to capture wind direction includes pressing and holding the button for a specified time, which is generally less than the specified time of step 305, e.g., less than 2 seconds, or more preferably less than 1 second.

In an embodiment, the step of pressing a button to capture wind direction 315 further includes automatically inputting the wind direction data to the viewing optic's onboard ballistics calculator and/or a memory device.

Step 320 is pressing a button or buttons to manipulate the wind speed value. In an embodiment, a viewing optic includes two buttons, such as the first and second selection buttons 4, 5 described above, one of which serves to allow a user to increase the wind speed value and the other to decrease the wind speed value.

Next, a range value is obtained (step 325) by activation of the ranging system. In addition, upon activation of the ranging system, the direction sensor will also capture the direction to the target. In an embodiment, the step of obtaining a range value includes aiming the viewing optic at a target and pressing a specified button to take a range. At the same time, the direction sensor determines the direction to the target.

In an embodiment, the specified button is a measure button 2 as described herein. In an embodiment, the step of pressing the specified button 325 includes pressing and holding the specified button, such as, for example, for a period of time necessary to obtain a consistent measurement.

Optionally, a specified button is pressed and held (or a sequence of buttons is pressed) in a last step 330 to exit the input modes. In an embodiment, the specified button is a menu button 1 as described herein. In an embodiment, the step of pressing and holding the specified button 330 includes pressing and holding the specified button 330 for a specified time, e.g., from 3 to 6 seconds, or preferably from 3 to 5 seconds. While useful to exit the ballistics calculator mode after setting each of the parameters described above, doing so is generally not required in order to use a viewing optic.

In a further embodiment, the method further includes the steps of pressing (and in some instances also holding) a specified button to enter/exit different modes to capture and/or display information obtained from additional sensors, including but not limited to, an anemometer, a barometric pressure sensor, a humidity sensor, and a temperature sensor. The steps associated with capturing and/or displaying data obtained from an anemometer, a barometric pressure sensor, a humidity sensor, and a temperature sensor can be completed either before step 305, 320, 325 or 330, or after step 330. The information captured with one or more of the sensors can be stored on a memory device.

In other embodiments, the method includes the steps of automatically capturing data from one or more sensors of an anemometer, a barometric pressure sensor, a humidity sensor, and a temperature sensor using the ballistic calculator. When the data from an anemometer, a barometric pressure sensor, a humidity sensor, and a temperature sensor is captured automatically, the data may be captured simultaneously with any of steps 305-330 or before or after any of steps 305-330.

In one embodiment, the disclosure relates to a user interface for entering wind direction and/or wind speed data. In another embodiment, the disclosure relates to a viewing optic having a user interface for entering wind direction and/or wind speed data. In an embodiment, a user interface may include a plurality of input and/or output devices such as buttons, keys, knobs, touchscreens, displays, etc.

Figure 4:
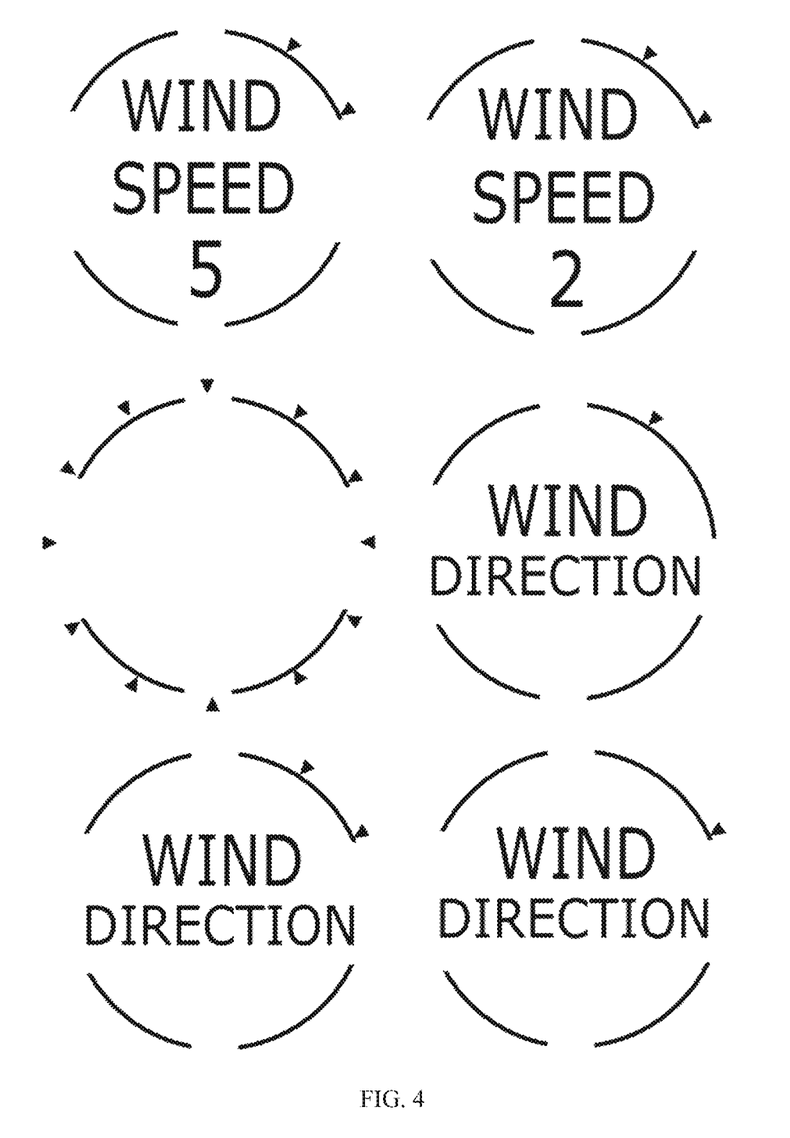
FIG. 4 is an exemplary user interface for displaying wind direction, wind speed and other ballistic information.

FIG. 4 illustrates an exemplary wind direction display portion of a user interface for a viewing optic. In particular, FIG. 4 illustrates a wind direction display portion of a user interface. The user interface can include additional information a user would desire to be displayed, such as, for example, battery life, network connection information (e.g., wireless connection strength, network connection name, Bluetooth™ connection status), distance to a target, user profile information, wind speed, absolute bearing, ballistics information, etc. Such a wind direction display portion may be provided on a viewing optic with an integrated ballistics calculator or provided on a device, such as a computer, smart phone or other connected device.

As shown in FIG. 4, the wind direction display portion includes a circle or a broken circle. In the embodiment shown, the circle or broken circle is a broken circle. With reference to the orientation of FIG. 4, the broken circle contains gaps at approximately 12:00, 3:00, 6:00 and 9:00. The gaps at 3:00 and 9:00 are shown as larger than the gaps at 12:00 and 6:00. More particularly, in the embodiment shown, the circle or broken circle is a broken circle having gaps at approximately 0°, 90°, 180° and 270°, with the gaps at 0° and 180° having a degree measure from 2.5°, or 5°, or 7.5° to 10°, or 12.5°, or 15°, or 17.5°, or 20° and the gaps at 90° and 270° having a degree measure from 20°, or 25°, or 30°, or 35°, or 40° to 45°, or 50°, or 55°, or 60°, or 65°. In further embodiments, the gaps may all be of equal size or independently different sizes.

The additional information is shown inside the circle or broken circle. By keeping the additional information within the circle or broken circle, the information remains organized and uncluttered to the user.

The circle or broken circle is surrounded by a plurality of independently visible marks. In the embodiment shown, the independently visible marks are triangles. However, in further embodiments, the visible marks may take any shape. In one embodiment, the visible marks are able to indicate a direction generally toward the center of the circle or broken circle.

As shown in FIG. 4, the visible marks are evenly spaced around the circle or broken circle at locations generally corresponding to the numbers on a clock. That is, in the embodiment shown, the visible marks are located at 30° increments about the circle or broken circle, with one mark occurring at each of 0°, 30°, 60°, 90°, 120°, 150°, 180°, 210°, 240°, 270°, 300° and 330° about the circle or broken circle. In further embodiments, marks may be arranged at different positions around the circle or broken circle, such as with more or less frequency or at various positions. In still further embodiments, different shapes of marks may be provided to correspond with various positions. In still further embodiments, marks may be portions of the circle or broken circle itself.

Using an input device, such as buttons, on the user interface, a user can use the wind direction display portion to identify and select a wind direction. In the present embodiment, activating an input device, such as a button, causes at least one of the visible marks to be more visible than the other marks. A further activation of the input device causes either (1) a subsequent mark to become more visible than the other marks and the previously more visible mark to become less visible, or (2) a subsequent mark to become just as visible as the at least one more visible mark.

By way of nonlimiting example, the process of entering a wind direction using the user interface is as follows. A user pushes a wind direction button and the mark at 0° illuminates. A second press of the button causes the mark at 30° to also illuminate, signaling a wind direction of 15° relative to the user. A third press of the button causes the mark at 0° to un-illuminate, signaling a wind direction of 30° relative to the user. This process is continued around the perimeter of the circle or broken circle, with a single mark illuminated or otherwise highlighted or made more visible to indicate a wind direction, relative to the user, of that position and two adjacent marks illuminated or otherwise highlighted or made more visible to indicate a wind direction, relative to the user, of a position between the two marks.

Figure 5:
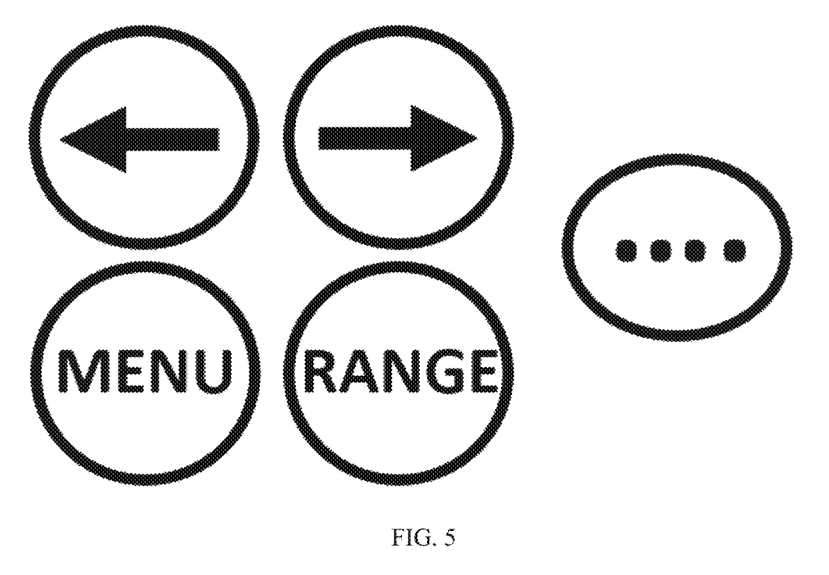
FIG. 5 is an exemplary user interface and input devices for entering wind direction information.

By way of further illustration, FIG. 5 shows exemplary user interfaces when entering a wind direction. Activation of an input device, such as a button or tap on a touch screen, causes a one increment adjustment in the wind direction.

In the embodiment shown, activation of the input device causes the wind direction marks to change in the clockwise direction (i.e., from 0° to 360°). In further embodiments, the input device causes the wind direction marks to change in the counterclockwise direction. In still further embodiments, two input devices may be provided—one which causes change in the clockwise direction and one which causes change in the counterclockwise direction.

Also as shown in FIG. 5, exemplary input devices include a menu button for accessing various menus, a measure button for entering the mode for changing wind speed, a wind bearing capture button for entering the mode to change the wind direction, and two value adjusting buttons which in the embodiment shown are left and right arrows, respectively.

With particular reference to the method of adjusting the wind direction depicted in FIG. 5, a user would adjust wind direction as follows. First, the user would press and hold a wind bearing capture button to enter the wind bearing capture mode. In the wind bearing capture mode, the additional information in the circle or broken circle is replaced with a caption indicating the wind bearing capture mode has been accessed. The user then presses either of the adjusting buttons as desired until the proper relative wind direction is displayed.

In one embodiment, the user would press a right adjusting button a first time to change the relative wind direction from 30° to 45°. A second push of the right adjusting button moves the relative wind direction from 45° to 60°.

In the embodiments, marks are described as illuminated. In other embodiments, the marks can be highlighted or otherwise become more visible in a different way, such as through changing color, flashing, changing shape, etc.

In one embodiment, exemplary input devices are shown as being on a panel directly adjacent the user interface. In further embodiments, the input devices are located elsewhere relative to the user interface, such as, for example, below, above or otherwise separated from the user interface by a distance.

In one embodiment, the user interface includes a wind speed display.

Figure 6A:
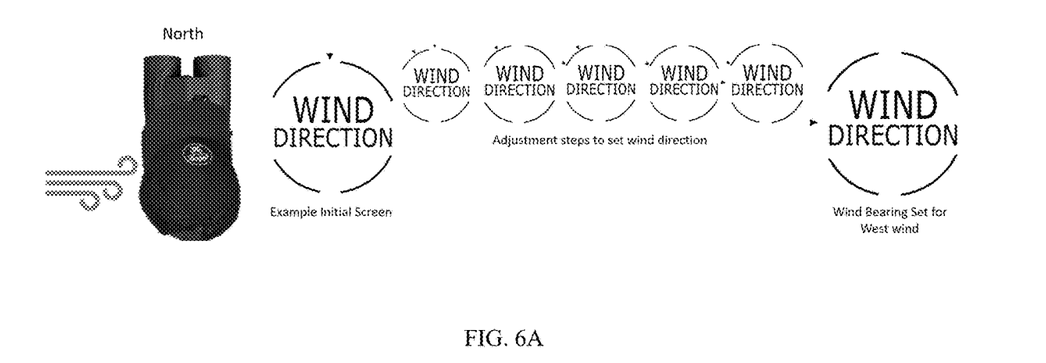
FIG. 6A depicts the associated interface and steps for a user looking North and entering a wind out of the West from a previously entered wind out of the North.
Figure 6B:
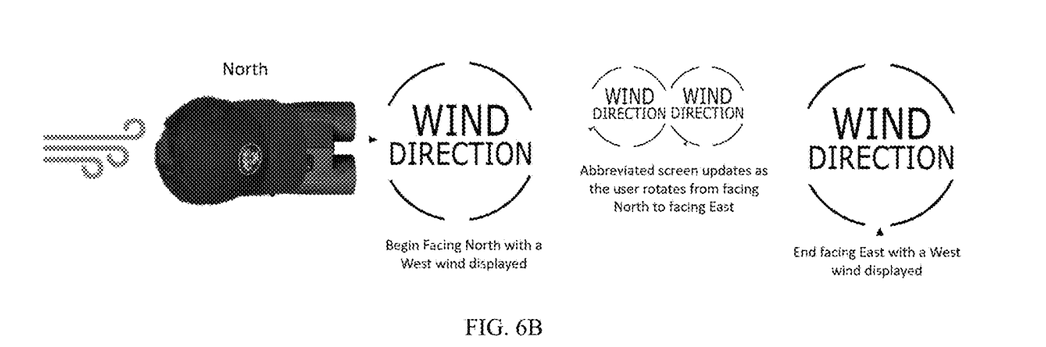
FIG. 6B depicts the associated interface and steps for a user who has set the previous Westerly wind and then rotates from facing North to facing East.

Also shown in FIGS. 6A-6B are exemplary input devices as shown and described with reference to accompanying figures. In particular, the exemplary input devices include a menu button for accessing various menus, a measure button for entering the mode for changing wind speed, a wind bearing capture button for entering the mode to change the wind direction, and two value adjusting buttons which in the embodiment shown are left and right arrows, respectively.

With particular reference to the method of adjusting the wind speed depicted in FIGS. 6A-6B, a user would adjust wind speed as follows. First, the user would press and hold the measure button to enter the wind speed capture mode. In the wind speed capture mode, the additional information in the circle or broken circle remains visible, but the circle or broken circle and marks are removed from the view indicating the wind speed capture mode has been accessed. The user then presses either of the adjusting buttons as desired until the proper wind speed is displayed. In one representative embodiment, the user could press a left adjusting button three times to reduce the wind speed from 5 mph to 2 mph.

In one embodiment, the exemplary input devices are shown as being on a panel directly adjacent the user interface. In further embodiments, the input devices are located elsewhere relative to the user interface, such as, for example, below, above or otherwise separated from the user interface by a distance.

In an embodiment, an input device must be activated in order to enter the wind direction capture mode and/or wind direction capture mode. In one embodiment, a single "menu" input device is provided which allows a user to cycle through different menu and mode options. This single input device is in addition to and separate from the at least one input device which changes the marks and wind speed display. In another embodiment, the same input device or devices are used to change menu and mode options as for changing the wind direction marks and wind speed display.

In accordance with embodiments of the present disclosure, the user interface is used to receive and display data to/from a ballistic calculator. The ballistic calculator can be part of a viewing optic, such as a binocular, a range finder, a scope or other such device. In such an embodiment, the viewing optic may further include a battery, control module, data input device, processor, memory and/or one or more sensors, such as an anemometer, a compass, a thermometer, and/or any other sensor used to sense any variety of environmental conditions or characteristics associated with the viewing optic. Such a viewing optic may also include any type of digital storage or memory. The digital storage or memory may be configured to store the information inserted to and generated by the ballistics calculator.

In an embodiment, the digital storage or memory may be remote and accessed by a viewing optic through a wired or wireless connection.

In further embodiments, the ballistic calculator is provided on a remote device while the user interface is provided on the viewing optic. In such embodiments, digital storage or memory may be located on the viewing optic and/or contained remotely. The viewing optic and ballistic calculator communicate through a wired or wireless connection.

In a further embodiment, a user interface is configured to be displayed on a device external to both a ballistic calculator and a viewing optic, such as a computer, mobile device, cell phone, etc. In such embodiments, a user may input wind direction, wind speed, and/or additional data, and that data may then be displayed on a further user interface provided on the viewing optic or a plurality of viewing optics or other devices capable of communication with the ballistic calculator.

The apparatuses and methods disclosed herein are further described by the following paragraphs:

A method comprising: (a) displaying on a user interface a wind bearing capture interface comprising a circle or broken circle and a plurality of marks at a position on the perimeter of the circle or broken circle; wherein the plurality of marks correspond to wind direction; (b) setting wind direction to correspond to one of the plurality of marks; and (c) illuminating and displaying a new mark of the plurality of marks that corresponds to wind direction on the user interface based on a change in direction or compass heading.

A user interface configured to be displayed on a viewing optic, a ballistic calculator, a computer, a mobile device, and combinations thereof.

A user interface configured to display wind direction information input into the ballistic calculator.

A user interface configured to display wind speed information input into the ballistic calculator.

A user interface of any of the preceding paragraphs comprising a circle or broken circle and a plurality of marks spaced about the perimeter of the circle or broken circle.

A user interface of any of the preceding paragraphs, wherein the circle is a broken circle.

A user interface of any of the preceding paragraphs, wherein the marks are triangular.

A user interface of any of the preceding paragraph, wherein the marks are positioned at 30° intervals about the perimeter of the circle or broken circle.

A user interface of any of the preceding paragraphs, wherein the marks correspond to a wind direction.

A user interface of any of the preceding paragraphs, wherein the marks are able to sense the direction and luminate as a user faces a new direction to provide visual feedback relative to a compass heading.

A user interface of any of the preceding paragraphs, wherein the user interface is configured to automatically display wind direction in response to change in orientation.

A ballistic calculator comprising a user interface in accordance with any of the preceding paragraphs.

A viewing optic comprising a user interface in accordance with any of the preceding paragraphs.

A rangefinder comprising a user interface in accordance with any of the preceding paragraphs.

A method of entering wind direction information into a ballistic calculator comprising: displaying on a user interface a wind bearing capture interface comprising a circle or broken circle and at least one mark at a position on the perimeter of the circle or broken circle; and activating an input device to either (i) change the position of the at least one mark on the perimeter of the circle or broken circle, or (ii) display a second mark at a second position on the perimeter of the circle or broken circle.

A method of any of the preceding paragraphs, comprising a second step of activating an input device to either (i) change the position of the at least one mark on the perimeter of the circle or broken circle, or (ii) hide one of the at least one mark and the second mark.

A method of any of the preceding paragraphs, comprising repeating the step of activating an input device until the at least one mark corresponds to a desired wind direction or until the at least one mark and the second mark together correspond to the desired wind direction.

A method of any of the preceding paragraphs further comprising accessing a wind bearing capture mode before displaying the wind bearing capture interface.

A method of any of the preceding paragraphs further comprising displaying on the user interface a wind speed capture interface comprising a numerical representation of a wind speed; and activating an input device to change the wind speed to a desired wind speed.

A method of displaying wind direction comprising updating wind direction automatically as a user changes heading.

A method of any of the preceding paragraphs, further comprising displaying the wind direction on a user interface.

A method of any of the preceding paragraphs, wherein a mark rotates around a circle to identify wind direction relative to the user.

A method of any of the preceding paragraphs, further comprising displaying the last ranged target with a unique identifier.

A method of any of the preceding paragraphs, wherein the unique identifier is a different indicator than what is displayed for the wind.

While multiple embodiments of a user interface, ballistic calculator and viewing optic have been described in detail herein, it should be apparent that modifications and variations thereto are possible, all of which fall within the true spirit and scope of the invention. With respect to the above description then, it is to be realized that the optimum dimensional relationships for the parts of the viewing optics of this disclosure, to include variations in size, materials, shape, form, function and manner of operation, assembly and use, are deemed readily apparent and obvious to one of skill in the art, and all equivalent relationships to those illustrated in the drawings and described in the specification are intended to be encompassed by embodiments of the present disclosure. Further, since numerous modifications and changes will readily occur to those skilled in the art, it is not desired to limit the invention to the exact construction and operation shown and described, and accordingly, all suitable modifications and equivalents may be resorted to, falling within the scope of this disclosure.

What is claimed is:

1. An apparatus with a processor for controlling a viewing optic comprising:
    a circle or a broken circle and a plurality of marks spaced about the perimeter of the circle or the broken circle, wherein the plurality of marks correspond to a wind direction, and further wherein the plurality of marks luminate as a user faces a new direction to provide visual feedback relative to a compass heading.

2. The user interface of claim 1, wherein the circle is a broken circle.

3. The user interface of claim 1, wherein the plurality of marks are triangular.

4. The user interface of claim 1, wherein the plurality of marks are positioned at about 30° intervals around the perimeter of the circle or broken circle.

5. The user interface of claim 1, further wherein the plurality of marks illuminate to display wind direction in response to change in orientation.

6. A monocular comprising the user interface of claim 1.

7. A rangefinder comprising the user interface of claim 1.

8. A viewing optic comprising:
    a body, the body including a user interface; wherein the user interface comprises a circle or broken circle and a plurality of marks spaced about the perimeter of the circle or broken circle, wherein the plurality of marks correspond to a wind direction, and further wherein the plurality of marks luminate as a user faces a new direction to provide visual feedback relative to a compass heading;
    a ranging system for measuring a distance to a target and mounted within the body;
    a direction sensor mounted within the body for determining direction of wind and direction of the target; and
    a processor mounted within the body and capable of controlling information for showing on the display.

9. The user interface of claim 8, wherein the plurality of marks are positioned at about 30° intervals around the perimeter of the circle or broken circle.

10. The user interface of claim 8, further wherein the plurality of marks illuminate to display wind direction in response to change in orientation.

11. The viewing optic of claim 8, wherein the viewing optic is a monocular or a binocular.

12. The viewing optic of claim 8, wherein the viewing optic is a rangefinder.

13. A method comprising:
  (a) displaying on a user interface a wind bearing capture interface comprising a circle or broken circle and a plurality of marks at a position on the perimeter of the circle or broken circle; wherein the plurality of marks correspond to wind direction, and further wherein the plurality of marks are positioned at about 30° intervals around the perimeter of the circle or broken circle;
  (b) setting wind direction to correspond to one of the plurality of marks; and
  (c) illuminating and displaying a new mark of the plurality of marks that corresponds to wind direction on the user interface based on a change in direction or compass heading.

14. The method of claim 13, wherein the plurality of marks are triangular.

* * * * *